Dec. 16, 1952     L. R. STEINHARDT     2,621,560
MEANS FOR ELIMINATING INTERFERENCE BETWEEN THE OPTICAL
TRAINS OF A PHOTOGRAPHIC REPRODUCING APPARATUS
Filed Nov. 17, 1949     2 SHEETS—SHEET 1
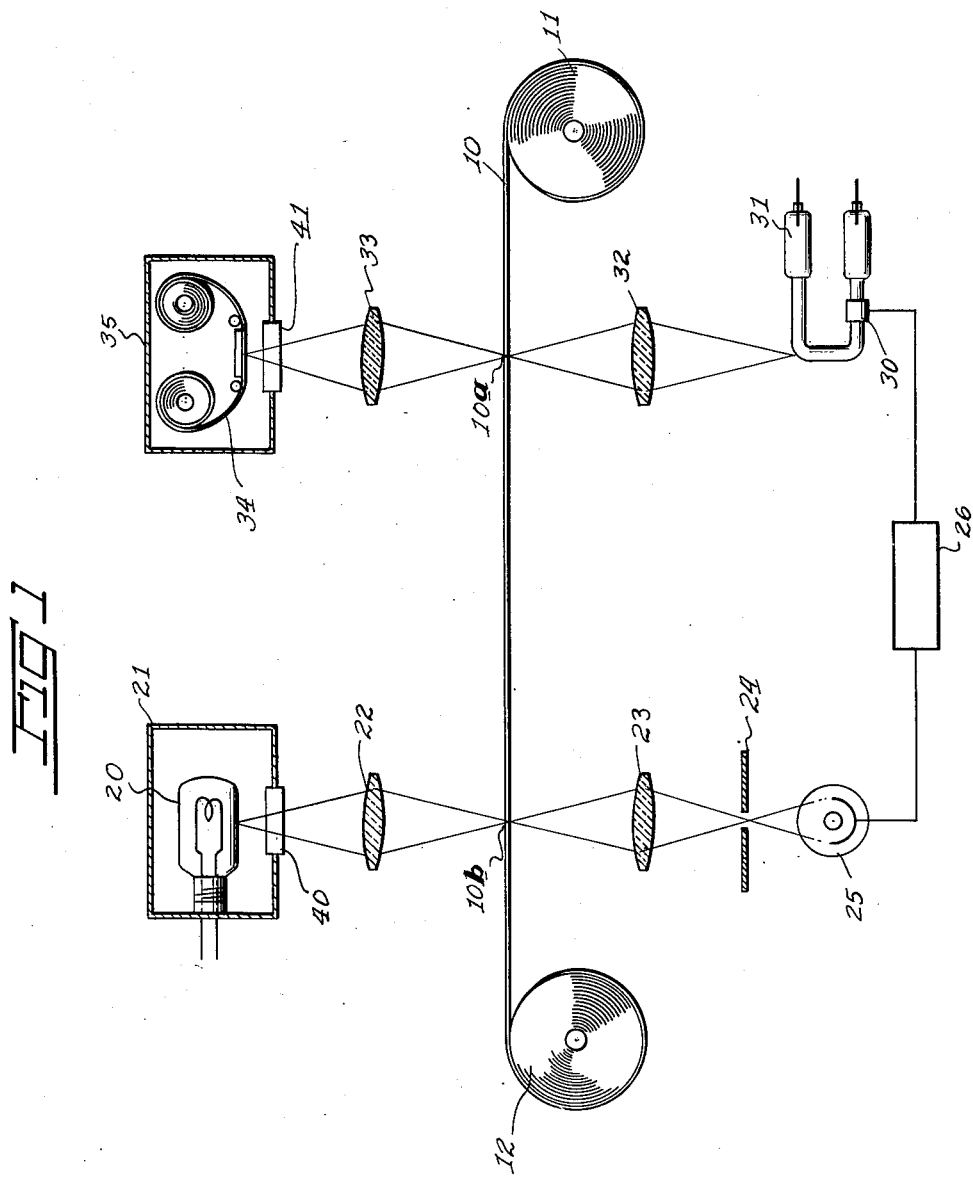
INVENTOR
*Lawrence R. Steinhardt*
BY *Cushman, Darby & Cushman*
ATTORNEYS

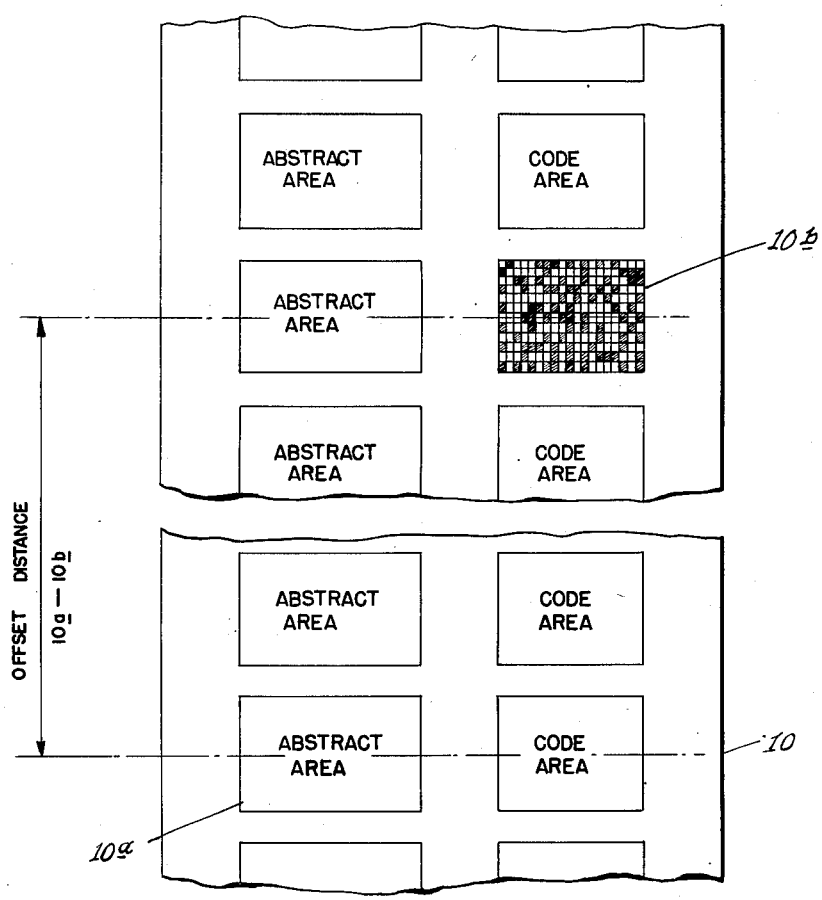

Patented Dec. 16, 1952

2,621,560

UNITED STATES PATENT OFFICE 2,621,560

MEANS FOR ELIMINATING INTERFERENCE BETWEEN THE OPTICAL TRAINS OF A PHOTOGRAPHIC REPRODUCING APPARATUS

Lawrence R. Steinhardt, Washington, D. C., assignor to Engineering Research Associates, Inc., St. Paul, Minn., a corporation of Minnesota Application November 17, 1949, Serial No. 127,846

3 Claims. (Cl. 88—24)

This invention relates to means for preventing undesired fogging of the print in a light actuated photographic reproducing apparatus.

Briefly, the invention contemplates screening the actuating light from the printing member by mutually interfering light sensitive means, so that light from the actuating source cannot fog the print. By way of example, three means are disclosed in detail, although other means will occur to one skilled in the art. In one system, a long wave length filter screens the source of actuating light, and a short wave length filter screens the print. In another system, a light polarized lens screens the light and a perpendicularly polarized lens screens the print. In yet another system, a long wave length filter screens the light source, and a printing film is employed which is insensitive to the long wave lengths passed by the filter.

It is, therefore, an object of this invention to prevent fogging of the printing film in a recopying camera.

Still other objects and the entire scope of the invention will become apparent in the following description and appended claims. The description is by way of illustration only, and applicant does not intend to be bound to the specific modifications of his invention, since many other ways of carrying out the invention may occur to those skilled in the art. While the disclosure is confined to a microfilm selector for sake of coherence and clarity, obviously any recopying apparatus is applicable.

In the drawings:

Figure 1 shows the principal elements which are typical of a microfilm selector, together with the additional equipment required in the practice of the present invention.

Figure 2 shows a typical master film used in a microfilm selector of this type.

A microfilm selector is a device for rapidly scanning through written material which has been recorded on microfilm in a prescribed form so that certain desired items may be selected therefrom and reproduced on another piece of film by flash photography, without stopping the original or master film and without removing anything therefrom. Further details about such devices may be found in Publication PB 97535 of the Office of Technical Services, U. S. Department of Commerce, Washington 25, D. C.; page 122 of the September 1949 issue of Electronics. Such a microfilm selector comprises at least a master film 10 of a type further described below in connection with Figure 2, which passes in one direction or the other between reels 11 and 12. Approximately one-half the width of such film is scanned by a photoelectric system comprising a light source 20 contained in a housing 21, a condenser lens 22, a projection lens 23, a mask 24, and a photocell or a plurality of photocells 25. The arrangement of these parts is such that, whenever a dot pattern of the film 10, as projected by the optical system 20, 22, 23, agrees with a pattern punched in the mask 24, the photocells 25 recognize this condition and present an input signal to the electronic amplifier 26. After amplication, this signal is used to actuate the trigger circuit 30 of the high-speed flash tube 31, which is of a type well known in the art, capable of delivering a brief flash of light having a duration of only two microseconds. By means of condenser lens 32 and recopying lens 33, this causes an image of certain written material on film 10 to be projected upon an unexposed piece of film 34 contained in a recopying section 35. The film 10 is arranged in such a manner that the written material at 10a corresponds to the dot pattern at 10b, at this instant of time. Thus, the photoelectric system 20, 22, 23, 24 and 25 serves to scan the dot portion of film 10 to determine if there are any dot patterns thereon which correspond to the pattern punched in the mask 24. If so, then the recopying optical system 31, 32, 33, 34, 35 is immediately brought into play and causes this particular portion of written material to be rephotographed on the recopying film 34, without stopping film 10. Film 10 is previously prepared with the offset between corresponding dot patterns and written material equal to the distance from 10a to 10b. After such an operation is completed, a film advance mechanism (not shown) causes a fresh portion of the film 34 to be brought into the action portion within the camera 35, so that the operation may be repeated if another desired item is found. In one typical application, the film 10 is divided into two halves longitudinally, half having written material such as abstracts of bibliographies, and the other half having placed thereon a series of dot patterns which are codified in such a way as to characterize the contents of the abstracts. A typical layout of film 10 is shown in Figure 2, which also shows the offset distance 10a—10b.

The foregoing description is presented as introductory information only and does not constitute a description of the present invention, which will now be described.

One difficulty with a microfilm selector, as above described, is that stray light, originating at the light source 20, may inadvertently strike certain parts of the machine, such as the film 10 or the guides or rollers over which it passes, and by a devious route eventually strike the unexposed recopying film 34 in the recopying camera 35. The nature of a microfilm selector is such that it is impossible to provide camera 35 with a mechanical shutter which would open only when flash tube 31 is actuated; therefore, it is necessary to leave the sensitive film 34 in an exposable condition at all times. It is, of course, obvious that it is highly undesirable to resort to extreme spacing of the code and abstract material. Films are subject to stretching and shrinking, and thus the spacing between abstract and code areas must be kept at a minimum or the code will not properly operate the recopying means. The demands of the art also require a compact unit, which is one of the reasons for the herein invention. Attempts have been made to prevent this stray light fogging of the film 34 by expedients such as the operation of the two optical systems in opposite directions as shown in Figure 1, and the inclusion of tight baffling about both optical systems. These attempts have met with some measure of success, but they are not entirely satisfactory and, in practice, it has been found that with the very best of baffling or other means the film 34 will nevertheless fog and become useless if it remains in the active position for about 2 minutes. The present invention describes three species of means for overcoming this difficulty by utilizing the radiations employed in the two optical systems so that no interaction results.

In the first, and preferred, practice of this invention, I employ a red filter such as Wratten light filter No. 25 or No. 29, as schematically illustrated at 40 in Figure 1. This filter, together with the light-tight housing 21, assures that only the long wave length radiations substantially longer than about 600 millimicrons escape from the light source into the remainder of the machine. Since it is a characteristic of photocells and light sources of the type presently available that their operation takes place primarily in this long wave region of the spectrum, it will be found for that reason that the introduction of such a red filter has only negligible effect upon the sensitivity of the photocell 25. As a typical example, if 20 is an ordinary tungsten incandescent light operating about 2870° K., and if photocell 25 is of a type known in the trade as a 921, having a so-called S-1 response which is a maximum around 800 millimicrons, then it will be found that the introduction of a Wratten light filter No. 25 in the position indicated will cause only a 20% diminution in the sensitivity of the photocell 25. This loss in sensitivity will have a negligible effect upon the overall operation of the microfilm selector; it may either be disregarded or compensated for by an appropriate increase in the intensity of light 20 or in the gain of amplifier 26. For a recopying film 34, I then select a film of a type known as orthochromatic, which inherently has the property of being almost completely insensitive to radiations longer than 600 millimicrons. Thus, it is obvious that no light from the source 20 is available in wave lengths to which the film 34 is responsive.

In a second system film which is sensitive to substantially all wave lengths, such as the type known as panchromatic, may be used as the recopying film 34, together with a glue filter, such as Wratten No. 47, in position 41. In this arrangement only short wave lengths of light are capable of entering the camera 35. Here again, or with the utilization of orthochromatic film 34 as above, there results no important diminution in the sensitivity of the recopying system. This is true because the flash lamp 31 inherently radiates its maximum energy in the blue region of the spectrum where filter 41 has its maximum transmissivity or where all orthochromatic films or noncolorsensitized films have their maximum sensitivity. At worst, the practice of this invention will not result in more than a 50% diminution in the recording sensitivity of the system, and there being a considerable excess of light available from the flash tube 31, this is easily made up either by increasing the electric input to the flash tube or by further opening the aperture of lens 33.

From the foregoing, it will be seen that each of the two optical systems is restricted to that region of the spectrum in which it operates most efficiently, and that, in such a case, the stray light on the photoelectric system can have only a negligible effect upon the unexposed film 34. It will be found that film 34 may remain in the camera 35 for as long as a half hour without fogging, as compared to less than 2 minutes without this filtering, and this improvement is enough to render the device practical in certain applications where otherwise the difficulty of fogging would prevent the proper utilization of this complex and compact equipment.

In a further embodiment of this invention, I use two pieces of a transparent sheet polarizing material containing a molecularly oriented transparent linear high polymer dyed with a dichroic substance, such as the material known as Polaroid, a commercially available item and fully described in U. S. Letters Patent Numbers 2,011,553, 2,041,138, 2,078,254, 2,359,428 and 2,544,515. It is the property of this material that when two such pieces are so employed and so arranged that their axes of polarization are mutually perpendicular, then substantially no light can pass through the pair, although each by itself alone transmits about 50%. Thus for a filter 40, I may arrange a piece of this Polaroid parallel to the direction of motion of the film, and for a filter 41, I may arrange another piece of this material perpendicular to the direction of motion of the film. Alternatively, 40 may be arranged perpendicular to the film motion and 41 parallel to it, or they may be arranged so that the axes of 40 and 41 are mutually perpendicular by having both make an angle of 45° with respect to the direction of film motion. In either case it will be found that the deleterious effects of stray light on film 34 are almost completely eliminated, but the sensitivity of each system is diminished only 50%.

The invention may also be employed in an apparatus which places the image of the master film on a fluorescent screen replacing film 34. In this application of the invention, the screen will be prevented from fogging from the light source 20 either because no light can pass a filter placed at 41, or because a fluorescent screen is selected which is not responsive to the energy passing the lens 40.

While in the above description specific embodiments of my invention have been explained, I intend that my invention be not limited to these specific embodiments, but shall be construed as broadly as possible in view of the appended claims.

I claim:

1. In photographic selector and recording apparatus for locating and reproducing selected intelligence areas from a master film having code and intelligence areas thereon and positioned within said apparatus, the apparatus comprising a first light source, means spaced from the master film for projecting light from said first source through code areas on the master film and onto a light responsive code detecting means spaced from the master film, a second light source, means responsive to the light responsive means to control the second light source, means for projecting light from the second source through the intelligence areas of the master film and onto a copy film, the first light source and the copying film being positioned within the apparatus in proximity to one another, means for preventing the fogging of the copy film by stray light issuing from said first source, the just mentioned means comprising first opaque means housing said first source for blocking the transmission of light from the first source in directions within the apparatus, to prevent such light from reaching the vicinity of copy film, the first opaque means being out of contact with the master film, first light wave length filtering means positioned in an opening in said first opaque means and constructed to permit the transmission therethrough of only light of a first predetermined wave length range for projection onto said code areas of the master film, the arrangement of the apparatus being such that stray light of said first wave length range issuing from said first filtering means may reach the vicinity of said copy film, the means for preventing the fogging of the copy film further including second opaque means housing the copying film and blocking the transmission therethrough of light within the apparatus to prevent such light from reaching and fogging the copy film, the second opaque means being out of contact with the master film, second light wave length filtering means positioned in an opening in said second opaque means and so constructed as to transmit therethrough only light of a second predetermined wave length range, the second light filtering means being positioned to receive the projected light from said second light source through said intelligence areas, the first mentioned light wave length range being selected to differ from the second mentioned light wave length range so that stray light of the first wave length range within said apparatus will be absorbed by said second light filtering means and therefore cannot reach and fog said copy film notwithstanding that such stray light may reach the vicinity of the copy film.

2. In photographic selector and recording apparatus for locating and reproducing selected intelligence areas from a master film having code and intelligence areas thereon and positioned within said apparatus, the apparatus comprising a first light source, means spaced from the master film for projecting light from said first source through code areas on the master film and onto a light responsive code detecting means spaced from the master film, a second light source, means responsive to the light responsive means to control the second light source, means for projecting light from the second source through the intelligence areas of the master film and onto a copy film, the first light source and the copying film being positioned within the apparatus in proximity to one another, means for preventing the fogging of the copy film by stray light issuing from said first source, the just mentioned means comprising first opaque means housing said first source for blocking the transmission of light from the first source in directions within the apparatus, to prevent such light from reaching the vicinity of copy film, the first opaque means being out of contact with the master film, first light polarization filtering means positioned in an opening in said first opaque means and constructed to permit transmission therethrough only light of a first predetermined axis of polarization for projection onto said code areas of the master film, the arrangement of the apparatus being such that stray light of said first polarization issuing from said first filtering means may reach the vicinity of said copy film, the means for preventing the fogging of the copy film further including second opaque means housing the copying film and blocking the transmission therethrough of light within the apparatus to prevent such light from reaching and fogging the copy film, the second opaque means being out of contact with the master film, second light polarization filtering means positioned in an opening in said second opaque means and so constructed as to transmit therethrough only light of a second predetermined polarization having its axis of polarization at substantially right angles to the axis of polarization of said first filtering means, the second light filtering means being positioned to receive the projected light from said second light source through said intelligence areas, whereby the first mentioned light polarization axis being selected to be at substantially right angles to the second mentioned light polarization axis, stray light from the first polarization means within said apparatus will be absorbed by said second polarization means and therefore cannot reach and fog said copy film notwithstanding that such stray light may reach the vicinity of the copy film.

3. In photographic selector and recording apparatus for locating and reproducing selected intelligence areas from a master film having code and intelligence areas thereon and positioned within said apparatus, the apparatus comprising a first light source, means spaced from the master film for projecting light from said first source through code areas on the master film and onto a light responsive code detecting means spaced from the master film, a second light source, means responsive to the light responsive means to control the second light source, means for projecting light from the second source through the intelligence areas of the master film and onto a copy film, the first light source and the copying film being positioned within the apparatus in proximity to one another, means for preventing the fogging of the copy film by stray light issuing from said first source, the just mentioned means comprising first opaque means housing said first source for blocking the transmission of light from the first source in directions within the apparatus, to prevent such light from reaching the vicinity of copy film, the first opaque means being out of contact with the master film, first light filtering means positioned in an opening in said first opaque means and constructed to permit the transmission therethrough of only light of a first predetermined characteristic for projection onto said code areas of the master film, the arrangement of the apparatus being such that stray light of said first characteristic issuing from said first filtering means may reach the vicinity of said copy film, the means for preventing the fogging of the copy film further including second opaque means housing the copying film and blocking the transmission therethrough of light within the apparatus to prevent such light from reaching and fogging the copy film, the second opaque means being out of contact with the master film, second light filtering means positioned in an opening in said second opaque means and so constructed as to transmit therethrough only light of a second predetermined characteristic, the second light filtering means being positioned to transmit therethrough the projected light from said second light source received through said intelligence areas and onto said copy film, the first mentioned light characteristic being selected to differ from the second mentioned light characteristic so that stray light of the first characteristic within said apparatus will be absorbed by said second light filtering means and therefore cannot reach and fog said copy film notwithstanding that such stray light may reach the vicinity of the copy film.

LAWRENCE R. STEINHARDT.

REFERENCES CITED

The following references are of record in the file of this patent:

UNITED STATES PATENTS

| Number | Name | Date |
|---|---|---|
| 1,253,137 | Brewster | Jan. 8, 1918 |
| 2,251,998 | Goodale | Aug. 12, 1941 |
| 2,262,051 | Sabol | Nov. 11, 1941 |
| 2,372,890 | Fassel | Apr. 3, 1945 |